Figure 1:
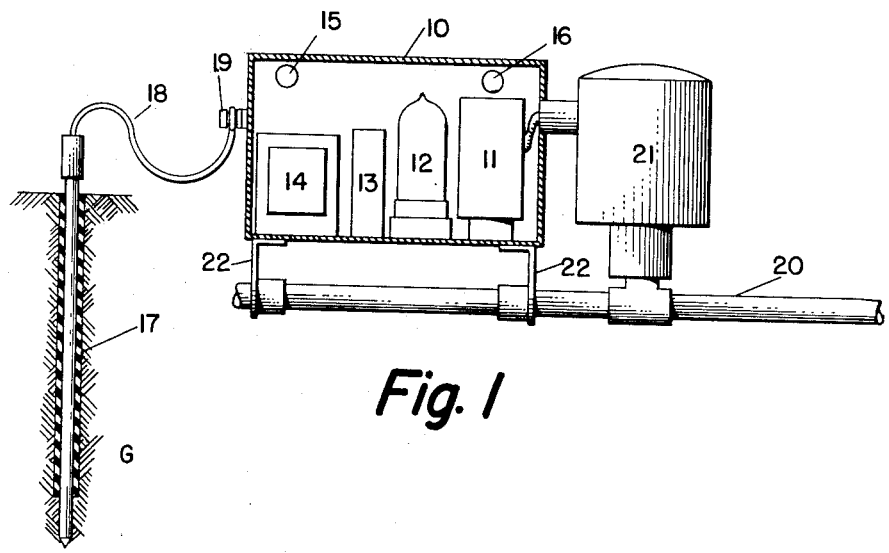

March 12, 1957    C. H. YOUNG ET AL    2,785,006

ELECTRONIC SOIL WATERING SYSTEM

Filed April 10, 1956

INVENTORS
CHARLES H. YOUNG
DANIEL J. GALASSO
BY

ATTORNEY

2,785,006
ELECTRONIC SOIL WATERING SYSTEM

Charles Hayden Young, Lansdowne, Pa., and
Daniel Joseph Galasso, Camden, N. J.

Application April 10, 1956, Serial No. 577,298

5 Claims. (Cl. 299—25)

The invention relates to lawn sprinkling or watering systems and in particular is directed to the automatic actuation of electrically operated valves in accordance with the moisture content of soil to be watered.

The invention contemplates a small housing in which selected electrical elements are compactly arranged and established in circuit between an electrical power source, such as house current and the valves of a watering system. A moisture sensing probe is provided in the circuit and is disposed at a suitable depth in the soil to be watered and certain of the elements in the housing are adjustable to provide for the opening and closing of the valves in accordance with the type of soil with which the device is used.

The adjustable elements are manually set, one to open a valve when a selected moisture content or soil resistance is sensed by the probe and the other to hold the valve in open position until a desired amount of moisture is added to the soil or until the soil reaches a preselected resistance.

An object of this invention is to provide a small compact electronic apparatus for controlling the watering or sprinkling of the soil when the moisture content of the soil is lower than a predetermined value.

Another object of the invention is to provide a Thyratron control circuit for both the opening and closing of an electric watering valve in accordance with changes in soil resistance.

Other and further objects of this invention will be apparent to those skilled in the art to which it relates from the following detailed description taken in conjunction with the drawing and claims.

The invention is essentially a device which automatically operates electric water sprinkling valves in accordance with the conductivity of the soil which is a function of its moisture content, thus the device operates only when it is determined that the soil needs water. The unit is light, compact, simple in design, and operates from regular city power services. It is readily usable in new or existing sprinkling systems. It eliminates the use of any clocks or other timing mechanism and since it operates only in accordance with the resistance or conductivity of the soil, it will close the watering valve automatically if the moisture content of the soil is suddenly increased, for example, by natural rainfall.

Figure 2:
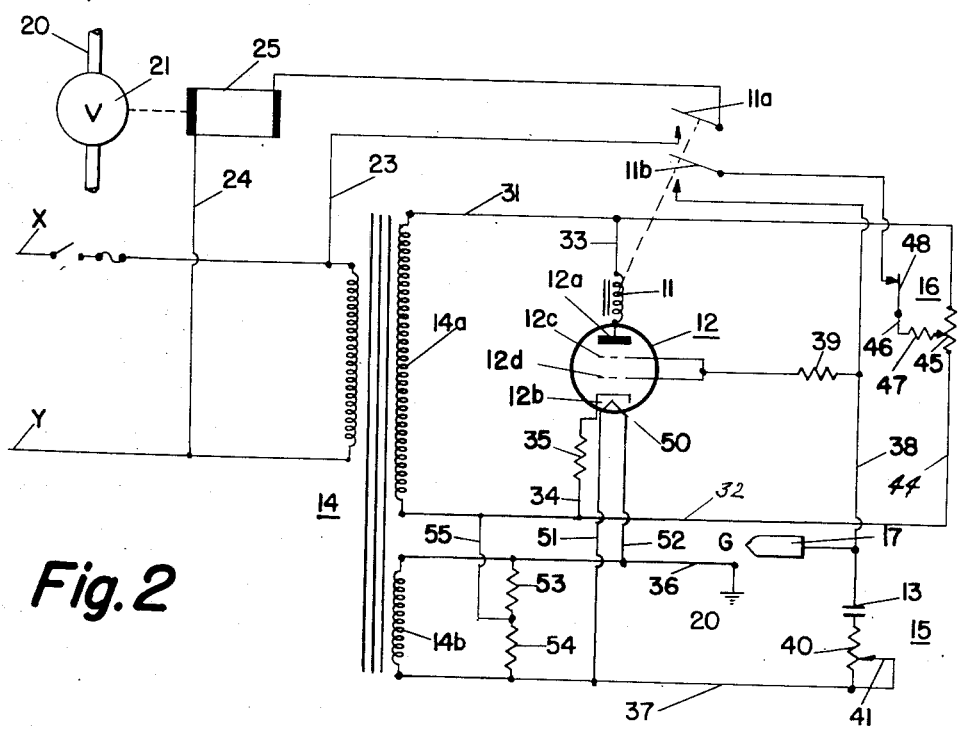

Fig. 1 is a generally diagrammatic view of the unit assembled and with the casing opened to show the general arrangement of the different electrical elements; and Fig. 2 is a wiring diagram of the elements of Fig. 1.

Referring to Fig. 1, the casing 10 houses a relay 11; Thyratron 12; phase shifting capacitor 13; transformer 14; moisture control 15 and moisture differential control 16. A metal sensing probe 17 is disposed in the soil or ground G and is connected by flexible line 18 and connector 19 to the circuits in casing 10. The sprinkling system is represented by conduit 20 and has an electric or magnetic water valve 21 therein. The selection and assembly of the elements is such as to permit their incorporation in a small housing which may be readily supported by and attached to the conduit 20 by suitable brackets 22.

In Fig. 2, the transformer 14 is connected to the X and Y sides of a conventional 110 volt A. C. power supply line. The upper terminal of the primary of transformer 14 is connected by line 23 to a normally open switch 11a, while the lower terminal of the primary is connected by line 24 to the solenoid 25 of valve 21.

The upper terminal of high voltage secondary 14a is connected to the plate or anode 12a of the Thyratron 12 by line 31 and branch line 33. A relay 11 is disposed in branch line 33 and controls the closing of switch 11a and a coacting switch 11b, the function of which will be described later. The lower terminal of the secondary 14a is connected to the cathode 12b of the Thyratron 12 by line 32 and a branch line 34 in which a cathode resistance element 35 is interposed.

The upper terminal of the low voltage secondary 14b is connected by line 36 to the watering system 20. The lower terminal of secondary 14b is connected by line 37 to the lower plate of a capacitor 13 through the moisture control indicated generally at 15. The upper plate of capacitor 13 is connected by line 38 to the switch 11b of relay 11. Grids 12c and 12d of Thyratron 12 are joined to the line 38 and the usual limiting resistor 39 is provided. Line 38 is also connected to the sensing probe 17. The low voltage secondary 14b will preferably be of about 6 volts.

The moisture control 15 provides a potentiometer comprising resistance 40 having adjustable arm 41 for selecting the signal voltage amplitude from the low voltage secondary 14b for controlling the firing of the Thyratron 12 to energize relay 11 and close the switchs 11a and 11b.

The moisture differential control 16 is positioned in line 44, between lines 31 and 32 of high voltage secondary 14a and provides a potentiometer comprising resistance 45, adjustable arm 46, limiting resistor 47 and switch 48 for supplying a selected voltage from secondary 14a, when the switch 11b is closed, to the grids 12c and 12d.

As is shown in Fig. 2, the secondary 14a is 180° out of phase with the signal voltage from secondary 14b and the control 16 is used for the purpose of supplying voltage from secondary 14a to maintain the valve 21 open after it has been opened by the signal voltage.

The capacitor 13 is provided to shift the phase of the moisture signal voltage which may be necessary in order to adapt the device particularly for soils which, by their chemical or physical composition, are of low resistance.

The usual heater 50 for the cathode 12b is connected to the terminal lines 36 and 37 of the secondary 14b by lines 51 and 52 and bias resistors 53 and 54 in secondary 14b are provided to establish fixed bias for the Thyratron 12 and are connected by line 55 to the upper secondary 14a.

The grids 12c and 12d, unlike the conventional Thyratron circuitry, are coupled together in parallel in order to increase the "turn off" sensitivity of the Thyratron and thus provide greater flexibility in the use of the device. Because of this grid arrangement, the Thyratron can only pull in and hold the relay 11 to cause the valve 21 to remain open, for a short period since a small amount of moisture added to the soil after the valve 21 is opened, will reduce the resistance of the soil sufficiently for the grid to lose controls over the Thyratron.

In order to provide at least a minimum valve opening period for about 5 percent increase in moisture content, a resistor 35 is provided in line 34 and the resistor 35 also functions as a stabilizer to overcome fluctuations in line voltage to the primary.

The moisture control can be set to operate at any selected resistance within the range of from about one-hundred to upwardly of one-hundred thousand ohms. The moisture differential control can be set for a change in resistance of the soil from about 10% to upwardly of 85%. For example, the moisture control 15 can be set to open the water control valve 21 when the resistance of the soil reaches a value of about 4000 ohms, while the differential control 16 can be set to hold the valve open until the resistance of the soil decreases about 10 percent or to a value of about 3600 ohms. Control 16 can be set also to hold the valve open until the soil resistance decreases about 85%, in which case the valve would remain open until the soil resistance was reduced to about 400 ohms.

As the moisture in the soil decreases, the resistance of the soil will increase and there will be a greater voltage drop across the soil resistance G wherein the probe 17 is located. When this voltage has reached the value for which the potentiometer resistor 40 is set, the Thyratron 12 will fire and the grids 12c and 12d will lose control over the Thyratron and relay 11 will close switches 11a and 11b. Switch 11a will complete the circuit to operate the solenoid 25 and open valve 21 and water will flow through the sprinkling system 20 in the vicinity of the soil G where the probe 17 is located.

In order to maintain the valve 21 open, voltage is supplied to the grids 12c and 12d by high voltage transformer 14a through switch 11b when it is closed to complete the circuit. The secondaries 14a and 14b are arranged to be 180° out of phase and the voltage which is supplied by secondary 14a is determined by the setting of the resistor 45 of moisture control 16. The resistor 47 is provided with potentiometer arm to supply a voltage of higher impedance to the grids 12c and 12d than the impedance of the signal voltage. Since the secondaries 14a and 14b are 180° out of phase, some of the signal voltage will thus be cancelled out and the soil resistance will be required to go through a greater change than that for which the moisture control 15 is set.

The setting of the variable resistor 40 of the control 15 will depend on the type of soil and the degree of moisture content at which it is desired to have the valve opened. Thus, an operator can choose at what moisture content or soil resistance the valve 21 should be opened and the soil sprinkled.

In operation, when the primary of the transformer 14 is energized bias, as established by the fixed bias resistors 53 and 54, is supplied to the grids 12c and 12d of Thyratron 12. If the bias on the grids is above the value for the Thyratron to fire, no current will pass through the circuit to plate 12a and hence the relay 11 will not operate to pull in and close switches 11a and 11b. If the moisture content of the soil G is low, that is, if the grid bias of the moisture control circuit 15 through the probe 17 is reduced to the value for which the resistance 40 is tapped, the signal voltage loses control, and the Thyratron 12 will fire and current will pass through the plate circuit and relay 11 will operate to close the contacts 11a and 11b, and the valve 21 will be opened.

The Thyratron 12 will continue to be conductive during the part of the A. C. cycle when the anode or plate 12a is positive with respect to the cathode 12b. The grids 12b and 12c will be less negative with respect to the cathode 12b due to their connection with line 37 of secondary 14b through resistor 49. Simultaneously with the opening of the valve 21, the auxiliary switch 11b which is then closed, causes the grid bias to become still less negative and in some instances it may go positive due to the circuit established through the control 16 with the secondary 14a.

Since the secondary 14a is 180° out of phase with the secondary 14b, the amplitude of the voltage which is supplied by secondary 14a and which is determined by the setting of the resistor 45 will cancel out some of the signal voltage and make the signal voltage less negative and perhaps positive. Consequently the ground resistance will have to go through a greater change of resistance in order for the moisture signal voltage to gain control of the Thyratron 12 and close the valve 21.

We claim:

1. An electrical control for a soil watering system including an electrically operated valve, which comprises a sensing probe disposed in the soil to be watered, a gaseous electronic discharge device having a cathode, an anode and control grid means, a transformer having a primary connected to a source of alternating potential and a first and second secondary of relatively low and relatively high potential respectively; a first circuit including said first secondary in series with a first potentiometer, said sensing probe, structure of the watering system and said control grid means; a second circuit including said second secondary in series with said cathode, said anode and a second potentiometer; said first potentiometer providing for the selection of a signal voltage from the first secondary which is effective to bias the control grid means and fire the electronic discharge device when the soil reaches a predetermined resistance value and said second potentiometer providing for the selection of additional voltage from the second secondary; a relay connected to said anode of the electronic discharge device and a pair of switches actuated by said relay, one of said switches controlling the power supply for operating said valve and the other switch being in circuit with the second potentiometer for supplying said additional voltage to the control grid means.

2. An electrical control for a soil watering system including a solenoid operated valve, which comprises a sensing probe disposed in the soil to be watered, a Thyratron having a cathode, an anode and a pair of control grids arranged in parallel, a transformer having a primary connected to a source of alternating potential and a first and second secondary of relatively low and relatively high potential respectively; a first circuit including said first secondary in series with a first potentiometer, said sensing probe, structure of the watering system and said pair of control grids; a second circuit including said second secondary in series with said cathode, said anode and a second potentiometer; said first potentiometer providing for the selection of a signal voltage from the first secondary which is effective to bias the pair of control grids and fire the Thyratron when the soil reaches a predetermined resistance value and said second potentiometer providing for the selection of additional voltage from the second secondary; a relay connected to said anode and a pair of switches actuated by said relay, one of said switches controlling the power supply for operating said valve and the other switch being in circuit with the second potentiometer for supplying said additional voltage to the pair of control grids and said pair of control grids being arranged in parallel whereby to increase the sensitivity of the Thyratron in order that it will be effective under the influence of the signal voltage to maintain the valve open only a short period to supply only a small amount of water to the soil.

3. An electrical control for a soil watering system including an electrically operated valve, which comprises a sensing probe disposed in the soil to be watered, a gaseous electronic discharge device having a cathode, an anode and control grid means, a transformer having a primary connected to a source of alternating potential and a first and second secondary of relatively low and relatively high potential respectively; a first circuit including said first secondary in series with a first potentiometer, a capacitor, said sensing probe, structure of the watering system and said control grid means; a second circuit including said second secondary in series with said cathode, said anode and a second potentiometer; said first potentiometer providing for the selection of a signal voltage from the first secondary which is effective to bias the control grid means and fire the electronic discharge device when the soil reaches a predetermined resistance value and said second potentiometer providing for the selection of additional voltage from the second secondary; a relay connected to said anode of the electronic discharge device and a pair of switches actuated by said relay, one of said switches controlling the power supply for operating said valve and the other switch being in circuit with the second potentiometer for supplying said additional voltage to the control grid means and said capacitor being operative to shift the phase of the signal voltage when the soil to be watered is of a type having a low resistance value.

4. An electrical control as in claim 3 further characterized by said control grid means comprising a pair of grids arranged in parallel to increase the sensitivity of the gaseous discharge device whereby said device will be effective under the signal voltage to maintain the valve open only a short period to supply only a small amount of water to the soil.

5. An electrical control for a soil watering system including a solenoid operated valve, which comprises a sensing probe disposed in the soil to be watered, a Thyratron having a cathode, an anode and control grid means, a transformer having a primary connected to a source of alternating potential and a first and second secondary arranged 180° out of phase and being of relatively low and relatively high potential respectively; a first circuit including said first secondary in series with a first potentiometer, said sensing probe, structure of the watering system and said control grid means; a second circuit including said second secondary in series with said cathode, said anode and a second potentiometer; said first potentiometer providing for the selection of a signal voltage from the first secondary which is effective to bias the control grid means and fire the Thyratron when the soil reaches a predetermined resistance value and said second potentiometer providing for the selection of additional voltage from the second secondary; a relay connected to said anode and a pair of switches actuated by said relay, one of said switches controlling the power supply for operating said valve and the other switch being in circuit with the second potentiometer for supplying said additional voltage 180° out of phase with the signal voltage, to the control grid means in order to be effective to cancel out some of the signal voltage whereby the Thyratron under the influence of the additional voltage will maintain the valve open until the soil resistance is decreased to the value for which the first potentiometer is set.

References Cited in the file of this patent

UNITED STATES PATENTS

| | | |
|---|---|---|
| 2,578,981 | Parker | Dec. 18, 1951 |
| 2,599,862 | Ray | June 10, 1952 |
| 2,611,643 | Higgins | Sept. 23, 1952 |
| 2,695,976 | Hasenkamp | Nov. 30, 1954 |